US 6,574,550 B2
Jun. 3, 2003

(12) United States Patent
Hashida (10) Patent No.: US 6,574,550 B2
(45) Date of Patent: Jun. 3, 2003

(54) NAVIGATION APPARATUS (75) Inventor: Masaya Hashida, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/137,328

(22) Filed: May 3, 2002

(65) Prior Publication Data

US 2002/0193940 A1 Dec. 19, 2002

(30) Foreign Application Priority Data

May 8, 2001  (JP) ........................................ 2001-137208

(51) Int. Cl.[7] ............................................ G06F 165/00
(52) U.S. Cl. ...................... 701/207; 701/210; 701/214
(58) Field of Search ................................ 701/200–213, 701/214; 340/990, 995; 342/357.1, 357.01–357.03

(56) References Cited

U.S. PATENT DOCUMENTS

| | | | | |
|---|---|---|---|---|
| 6,345,229 B1 | * | 2/2002 | Honkomp et al. | 701/207 |
| 6,408,245 B1 | * | 6/2002 | An et al. | 701/214 |
| 6,415,223 B1 | * | 7/2002 | Lin et al. | 701/207 |
| 6,420,999 B1 | * | 7/2002 | Vayanos | 342/357.03 |

FOREIGN PATENT DOCUMENTS

JP            61-116615        *   6/1986

* cited by examiner

*Primary Examiner*—Richard M. Camby
(74) *Attorney, Agent, or Firm*—Sughrue Mion, PLLC (57) ABSTRACT

A navigation system includes sensors to detect a moving direction and location of a mobile body. The navigation system first presumes a first route pattern, which includes straight and curve ways, from data supplied from the sensors. The navigation system then determines a second route pattern, based on data supplied from the sensors. The navigation system compares the first route pattern with the second route pattern. When the first route pattern is substantially the same as the second route pattern, a current moving direction and location of the mobile body detected by the sensors are calibrated in accordance with the first route pattern. The navigation system can accurately determine a current location of the mobile body even if the mobile body moves in a roofed building and no driveway data is available for the building.

20 Claims, 5 Drawing Sheets

NAVIGATION APPARATUS

BACKGROUND OF THE INVENTION

1. Field of the Invention

The present invention relates to a navigation apparatus for detecting a current location of a mobile body.

2. Description of the Related Art

One type of car navigation apparatus uses a recording medium such as CD-ROM which has map data stored therein. The map data includes road data which represent locations (or points) along streets/roads on a map by numbers. The car navigation apparatus detects a current location of the car and a moving direction of the car by using various sensors when the car is operated. At the same time, the car navigation apparatus reads a group of map data covering a certain area, which includes the current location of the car, from the recording medium to show a map of the area around the car in a display unit. The current location and moving direction of the car are both indicated automatically in the displayed map.

In the past, the navigation apparatus relies upon two navigation schemes. One scheme is self-contained navigation and the other scheme is GPS (global positioning system) navigation. The self-contained navigation utilizes self-contained sensors (e.g., acceleration sensor and angular velocity sensor) integrated in the navigation apparatus and does not receive any external support or information. The acceleration sensor and angular velocity sensor are used to detect (measure) navigation parameters such as acceleration and angular velocity of the car. The GPS navigation utilizes a plurality of artificial satellites which send measurement data (position data) to the navigation apparatus. The self-contained navigation has advantages and disadvantages, and the GPS navigation has advantages and disadvantages. In recent times, therefore, hybrid navigation is generally used, which combines (or compares) measurement data supplied from the self-contained navigation with measurement data supplied from the GPS navigation.

In order to improve detection accuracy of a current car location provided by the self-contained navigation or GPS navigation, a map matching technique is also employed. The map matching technique or process causes the detected car location to shift to the road of the map data (road corresponding to the map data) while the car is moving, if the detected car location deviates from the road of the map data. One example of such map matching process is disclosed in Japanese Patent Kokai No. 10-307037.

In the map matching process, if the current car location provided by the GPS navigation (referred to as "GPS car location") greatly deviates from the road of the map data, the navigation apparatus determines that the GPS car location is the true location of the car, and the display unit of the navigation apparatus displays a map in accordance with the GPS car location. However, when the car moves in a building such as a multi-story car park, the GPS car location suffers deteriorated accuracy because multipath affects the accuracy and/or the navigation apparatus cannot sufficiently receive measurement data (position data) from the artificial satellites. As a result, an accurate current location of the car is not obtained. In addition, if the map data does not have any data about the inside of the building, the map matching process cannot be performed even if the self-contained sensors provide the current car location. Such problems are also true to other types of navigation apparatus designed for other mobile bodies such as a human.

SUMMARY OF THE INVENTION

An object of the present invention is to provide a navigation apparatus that can determine a current location of a mobile body even when the mobile body moves in a building for which no map data is available.

According to one aspect of the present invention, there is provided a navigation apparatus comprising: a measurement unit for measuring a current moving direction and current location of a mobile body in accordance with navigation parameters of the mobile body; a presumption device for presuming a route pattern representing straight and curve ways along which the mobile body has moved, on the basis of the moving direction and current location of the mobile body measured by the measurement unit; a comparison unit for determining whether an actual route pattern determined in accordance with the moving direction and location of the mobile body measured by the measurement unit after the presumed route pattern is prepared matches the presumed route pattern; and a calibration unit for calibrating the current moving direction and current location of the mobile body measured by the measurement unit on the basis of the presumed route patter, when the comparison unit determines that the actual route pattern matches the presumed route pattern. A GPS device cannot provide accurate location data when the mobile body (e.g., a car) moves in a building having a roof (e.g., a multi-floor car park). Data about driveways in the car park may not be available in the navigation apparatus. The navigation apparatus can accurately determine the current location of the mobile body even if the mobile body moves in the roofed building and/or no driveway data is available.

DETAILED DESCRIPTION OF THE INVENTION

An embodiment of the present invention will be described in reference to the accompanying drawings.

Figure 1:
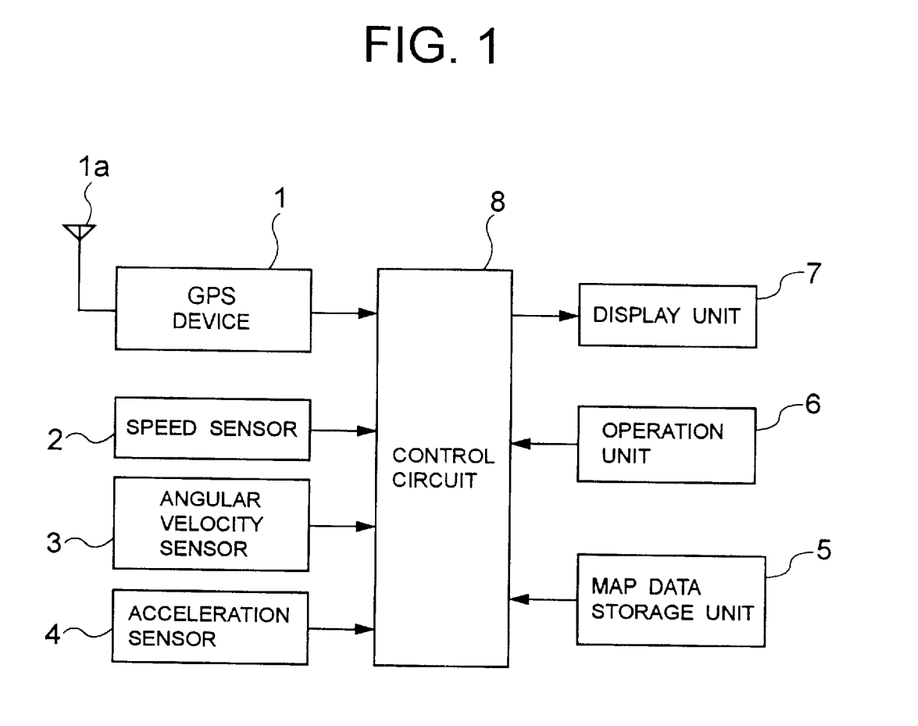
FIG. 1 illustrates a block diagram of a navigation apparatus mounted in a car.

Referring to FIG. 1, a car navigation apparatus according to one embodiment of the present invention is schematically illustrated. The car navigation apparatus is located in a car (not shown). The illustrated car navigation apparatus includes a GPS device 1, speed sensor 2, angular velocity sensor 3, acceleration sensor 4, map data storage device 5, operation unit 6, display unit 7 and control circuit 8. The GPS device 1 is connected to a GPS antenna 1a to receive radio waves (signals) transmitted from a plurality of artificial,satellites (not shown) thereby calculating GPS car location data including a current location of the car and a moving direction of the car on the basis of the radio waves. The speed sensor 2, angular velocity sensor 3 and acceleration sensor 4 are self-contained sensors to detect the current location and moving direction of the car without having information supplied from outside. The speed sensor 2 detects a speed of the car. The angular velocity sensor 3 detects an angular velocity of the car. The acceleration sensor 4 detects acceleration of the car.

The map data storage unit 5 includes a recording medium such as DVD and a drive device for the recording medium. Information (data) such as map data is recorded in the recording medium beforehand. The map data storage unit 5 reads (retrieves) the map data from the recording medium. The map data includes confines of a parking lot, driveways in the parking lot, and respective parking spaces (areas). The operation unit 6 is operated by a user to enter data and instructions into the navigation apparatus. The display unit 7 displays navigation (cruising) information such as a map.

The control circuit 8 is, for example, a micro computer. The control circuit 8 is connected to the GPS device 1, speed sensor 2, angular velocity sensor 3, acceleration sensor 4, map data storage unit 5, operation unit 6 and display unit 7 to control the navigation apparatus.

The control circuit 8 periodically receives output data of the GPS device 1, speed sensor 2, angular velocity sensor 3 and acceleration sensor 4 to determine the current location and moving direction of the car at predetermined intervals. The control circuit 8 then causes the display unit 7 to show a map around the current location of the car together with a car mark (car location mark). The car mark is placed at the current location of the car in the displayed map, and shows the moving direction of the car. The process for indicating the car mark in the displayed map is referred to as a car position indicating process. The car position indicating process will be described in reference to FIGS. 1 and 2.

Figure 2:
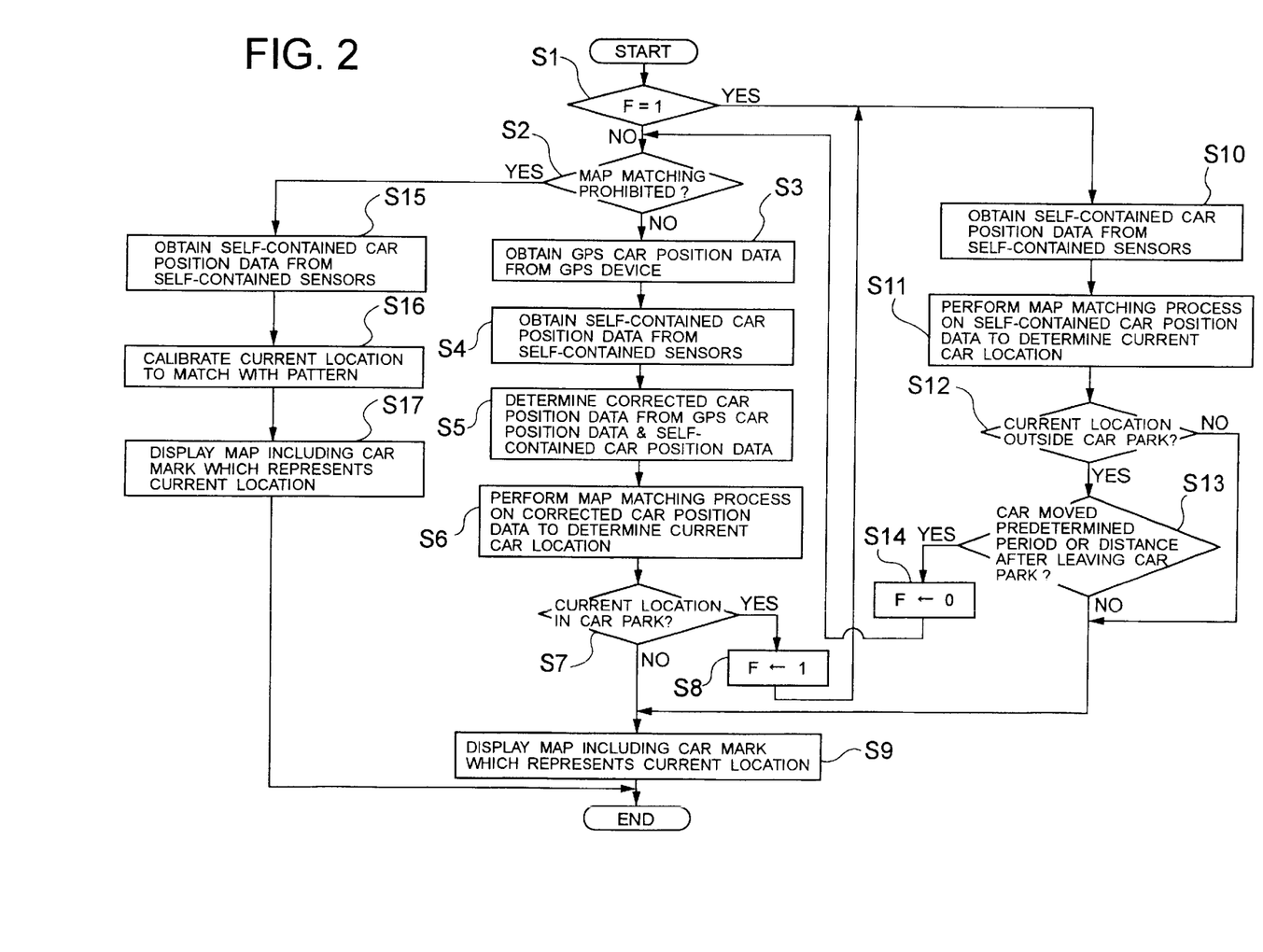
FIG. 2 illustrates a flowchart of a car location indicating process performed by a control circuit of the navigation apparatus shown in FIG. 1.

As shown in the flowchart of FIG. 2, the control circuit 8 determines whether a flag F is "1" or not (Step S1). The flag F is set to be "1" when the car is in a parking lot having a roof or multi-floor parking tower (garage) at Step S8 (will be described). If the current location of the car is outside the parking lot/tower and the GPS device 1 can accurately determine the current location of the car, the flag F is set to "0" at Step S14 (will be described). An initial value of the flag F is "0".

Figure 5:
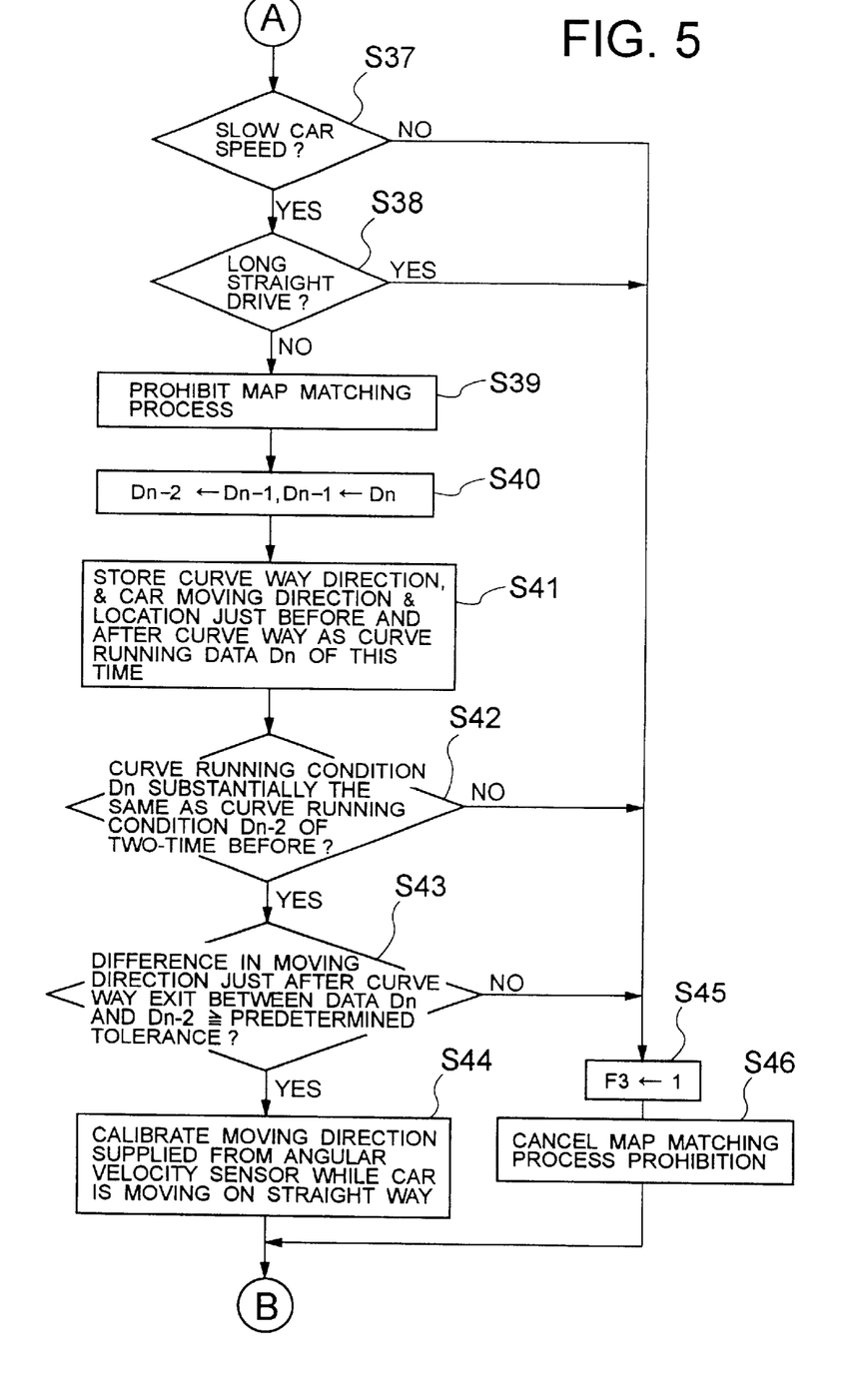

When it is determined at Step S1 that F is "0", the control circuit 8 determines whether the map matching process is prohibited (Step S2). Prohibition of the map matching process is decided at Step S39 (FIG. 5; will be described). When the control circuit 8 determines that the car moves in a multi-story parking tower for which no road data is available in the map data storage unit 5, the map matching process is prohibited. The parking tower may have one or more basements. The car lot may be an underground car park.

When the map matching process is not prohibited at Step S2, the control circuit 8 obtains GPS car position data from the GPS device 1 (Step S3). The control circuit 8 also obtains car position data from the self-contained sensors (Step S4). The car position data supplied from the self-contained sensors is referred to as self-contained car position data. Before the car position indicating process starts (or aside from the car position indicating process), the control circuit 8 periodically calculates self-contained car position data from speed, angular velocity and acceleration of the car, which are obtained from output data of the speed sensor 2, angular velocity sensor 3 and acceleration sensor 4 at prescribed intervals, and stores the self-contained car position data in a separate memory (not shown). The self-contained car position data stored in the separate memory includes the current location and moving direction of the car. The self-contained car position data is read from the separate memory at Step S4.

After Step S4, the control circuit 8 determines corrected car position data from the GPS car position data and self-contained car position data (Step S5). The control circuit 8 then performs the map matching process on the corrected car position data with respect to the road derived from the map data (Step S6). At Step S5, the GPS car position data is combined to the self-contained car position data to obtain the corrected car position data. The corrected car position data includes a corrected current location of the car and a corrected moving direction of the car. A method of combining the GPS car position data with the self-contained car position data is disclosed in detail in, for example, Japanese Patent Kokai Nos. 9-297030 and 10-30736, entire disclosures of which are incorporated herein by reference. At Step S6, the map data around the current car location is read from the map data storage device 5. If the current car location indicated by the corrected car position data is not present on the road of the map data, the current car location of the corrected car position data is forced to shift on the road of the map data. If, on the other hand, the current car location of the corrected car position data is present on the road of the map data, the current car location given by the corrected car location data is maintained.

Subsequently, the control circuit 8 determines whether the current car location determined at Step S6 is within confines of a parking lot/tower, on the basis of the map data retrieved from the storage device 5 (Step S7). If the current car location is within the confines of the parking lot/tower, the flag F becomes "1" (Step S8). The control program then proceeds to Step S10. Step S7 determines that the current car location is within the confines of the car park only when the map data storage device has map data of the parking lot/tower (particularly map data about drive ways inside the parking lot/tower).

If the current car location is outside the parking lot (No at Step S7), the control circuit 8 causes the display unit 7 to show a map including the current car location determined at Step S6, together with an arrow (car mark) (Step S9). A location of the arrow in the display screen indicates the current location of the car. The arrow also indicates the heading direction of the car.

If it is determined at Step S1 that F is "1", it means that the car is within the parking lot/tower or that the car is outside the parking lot/tower but the current location of the car cannot be accurately detected by the GPS device 1. When F=1, therefore, the control circuit 8 obtains car position data from the self-contained sensors (Step S10). Step S10 is the same as Step S4.

After Step S10, the control circuit 8 performs the map matching process on the current car location obtained by the self-contained sensors with respect to the road derived from the map data (Step S11). At Step S11, the map data around the current car location is read from the map data storage device 5. If the current car location indicated by the self-contained navigation is not present on the road of the map data, the current car location obtained by the self-contained sensors is forced to shift on the road of the map data. If, on the other hand, the current car location obtained by the self-contained sensors is present on the road of the map data, the current car location given by the self-contained navigation is maintained.

Subsequently, the control circuit 8 determines whether the current car location determined at Step S11 is outside the parking lot/tower, on the basis of the map data retrieved from the storage device 5 (Step S12). If the current car location is outside the parking lot/tower, it is determined whether the car has moved a predetermined period or distance outside the parking lot/tower (Step S13). If the answer is yes, the flag F becomes "0" (Step S14). The control program then return to Step S2.

If the current car location is within the parking lot (No at Step S12) or if the car has not moved the predetermined period or distance after leaving the parking lot (No at Step S13), the program proceeds to Step S9. The control circuit 8 then causes the display unit 7 to show a map including the current car location determined at Step S11, together with the car mark arrow.

If the map matching process is prohibited at Step S2, it means that a multi-story parking tower mode is selected in a parking tower driveway presumption routine (will be described in reference to FIGS. 4 and 5) and the car is moving in the multi-story parking tower. Thus, when the map matching process is prohibited, the control circuit 8 obtains current car location data from the self-contained sensors (Step S15). Step S15 is the same as Step S4.

After Step S15, the control circuit 8 corrects the current location data obtained from the self-contained sensors such that the current car location is shifted to a road pattern determined by curve way running data determined and stored in the parking tower driveway presumption routine (Step S16). The control circuit 8 causes the display unit to show a map including the corrected current location together with the car mark (Step S17).

Now, calculation of the car moving direction (azimuth) at Step S4, S10 or S15 will be described. The angular velocity sensor 3 detects an angular velocity caused by a direction change so that a change calculation angle value per a unit output (referred to as "gyro gain") is already obtained. The direction change is calculated from gyro data produced by the angular velocity sensor 3 using the gyro gain. By accumulating the gyro data while the car rotates 360 degrees during a rotation correction, the gyro gain can be given by the equation (1) where G represents the gyro gain. Ji represents the gyro data, and Jofs represents a gyro offset:

$$G = \frac{360°}{\left| \sum_{0°}^{360°} (J_i - J_{ofs}) \right|} \quad (1)$$

The moving direction (gyro direction) $\theta a_n$ calculated using the gyro gain G is obtained by the equation (2) where $\Delta\theta a_n$ is a relative gyro direction, $\theta a_n$ is the gyro direction, $\theta 0_{n-1}$ is a previous absolute direction, and gk is a gyro gain adjustment (compensation) coefficient (fixed to one).

$$\theta a_n = \theta 0_{n-1} + \Delta\theta a_n = \theta 0_{n-1} + (Ji \cdot Jofs) \times G \times gk \quad (2)$$

In the equation (2), the gyro offset Jofs is a value of the gyro data detected when no direction change occurs (e.g., when the car stops ). The gyro offset Jofs is reset at an appropriate timing. The previous absolute direction $\theta 0_{n-1}$ is the gyro direction obtained previously. The relative gyro direction $\Delta\theta a_n$ is the direction change angle obtained this time. The calculation of the moving direction $\theta a_n$ in accordance with the equation (2) is executed by the control circuit 8.

Figure 3:
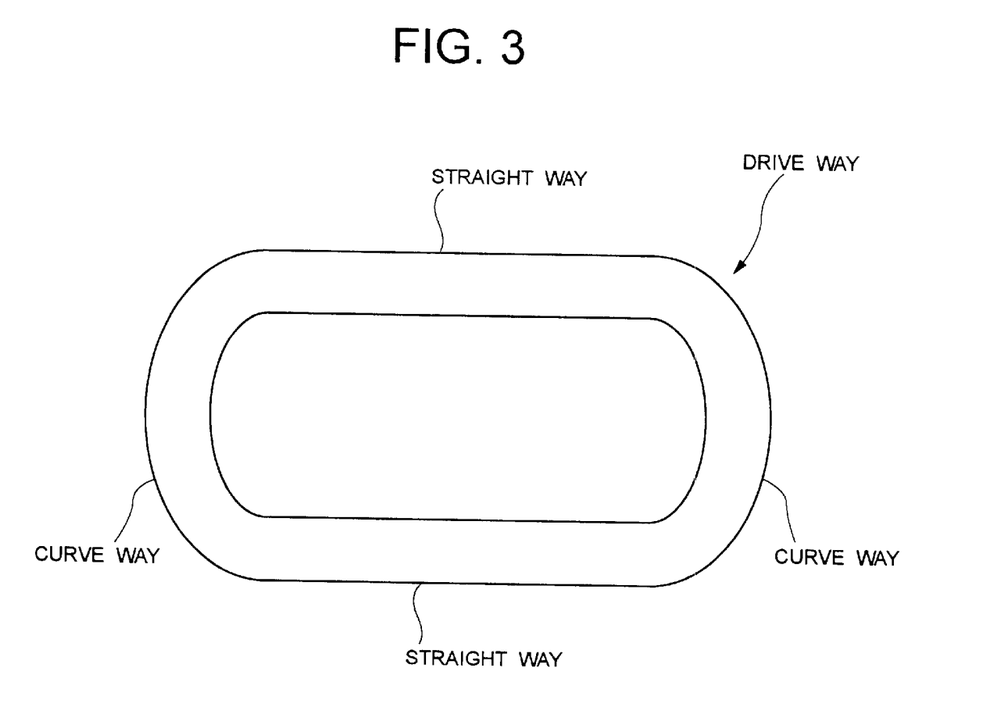
FIG. 3 schematically illustrates a drive way in a roofed building.

Apart from the car position indicating process, the control circuit 8 repeats the parking tower driveway presumption routine. It should be assumed here that each floor of the multi-floor parking tower has a driveway as shown in FIG. 3. Specifically, the driveway includes two parallel straight ways and two curve ways connecting the straight ways. The two curve ways are symmetrical. Presumption of the driveway starts when the routine of FIG. 4 starts.

Figure 4:
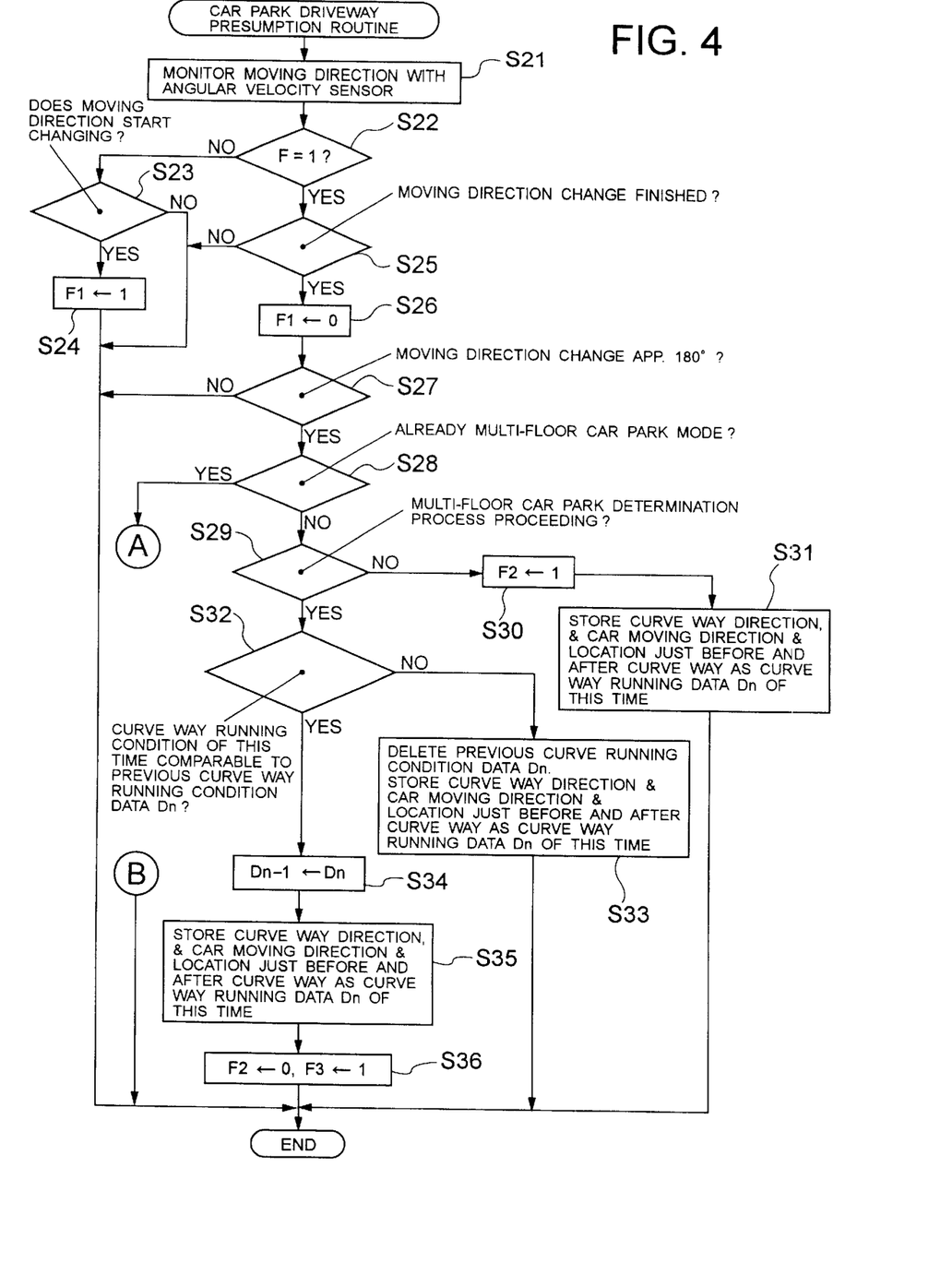
FIGS. 4 and 5 in combination illustrate a flowchart of a car park driveway presumption routine performed by the control circuit of the navigation apparatus shown in FIG. 1.

Referring to FIG. 4 which shows the parking tower driveway presumption routine, the control circuit 8 first monitors the moving direction of the car from the output signal of the angular velocity sensor 3 (Step S21). The control circuit 8 also determines whether a curve way flag F1 is "1" (Step S22). The curve way flag F1 is set to be "1" at Step S24 when the car moves in the curve way. If the curve way flag F1 is "0", the control circuit 8 determines whether the car moving direction starts changing (Step S23). If the car moving direction is changing, the control circuit 8 considers that the car is present in the curve way and makes the curve way flag F1 "1" (Step S24).

When F1=1 at Step S22, it means that the car took the curve way in the previous movement (at the time of execution of this routine). Thus, it is determined whether the change in the moving direction has stopped (Step S25). In other words, it is determined whether the car has exited the curve way. When there is no moving direction change, the curve way flag F1 becomes "0" (Step S26). It is then determined whether the moving direction change is approximately 180 degrees (Step S27). As understood from FIG. 3, when the car completely runs through the curve way, an approximate 180-degree moving direction change takes place. Step S27 determines whether such moving direction change has occurred. If the detected moving direction change is approximately 180 degrees, the control circuit 8 determines whether a multi-floor car park mode is already selected (Step S28). The multi-floor car park mode is selected at Step S36 when a mode flag F3 becomes "1" (will be described).

When the multi-floor car park mode is not selected, it is determined whether a multi-floor car park determination process is proceeding (Step S29). When the multi-floor car park determination process is not proceeding, a multi-floor car park determination flag F2 becomes "1" (Step S30). Then, the direction of the curve way, the moving direction and location of the car just before entering the curve way, and the moving direction and location of the car just after exiting the curve way are stored as current curve way running data Dn (Step S31). The direction of the curve way is either "to the right" or "to the left", which is determined on the basis of the moving direction change. The moving direction and location of the car just before entering the curve way are the moving direction and location of the car obtained in the routine of FIG. 4 executed one time before the start of the moving direction change is determined at Step S23. The moving direction and location of the car obtained in the previous execution of the routine of FIG. 4 are stored, regardless of the execution of Step S29, until the execution of Step S29 of this time. The moving direction and location of the car just after exiting the curve way are the moving direction and location of the car obtained when Step S25 determines that the moving direction changes has stopped. The moving direction and location of the car are stored in, for example, a memory (not shown) in the control circuit 8.

When Step S29 determines that the multi-floor car park determination is being made, it is then determined whether the curve way running condition of this time symmetric to the curve way running condition of the previous time Dn (Step S32). Specifically, it is determined whether the direction of the curve way of the previous time is the same as in this time, the running distance in the curve way of the previous time is substantially the same as in this time, and a straight way extending to the entrance of the curve way of this time is substantially parallel to a straight way extending from the exit of the curve way. If the curve way running condition of this time is not,symmetric to the curve way running condition of the previous time, the previous curve way running data Dn stored in the memory of the control circuit 8 is deleted. Instead, the direction of the curve way of this time, the moving direction and location of the car immediately before entering the curve way of this time, and the moving direction and location of the car immediately after leaving the curve way of this time are stored as the curve running data Dn (Step S33).

On the other hand, if the curve way running condition of this time is symmetric to the curve way running condition of the previous time, the curve way running data Dn is renamed to a previous curve way running data Dn-1 (Step S34). The direction of the curve way, the moving direction and location of the car immediately before entering the curve way, and the moving direction and location of the car immediately after leaving the curve way are stored as the curve running data Dn of this time (Step S35). Since the driveway pattern in the parking tower is determined (presumed), the parking tower determination flag F2 becomes "0" (Step S36). At the same time, the mode flag F3 becomes "1" (Step S36). The presumption of the route starts when the routine of FIG. 4 starts.

When Step S28 determines that the multi-floor car park mode is already selected, the control circuit 8 determines whether the car is moving at a low speed (Step S37 in FIG. 5). If the car speed is low, the control circuit 8 determines whether the car has run straight for a long period (Step S38). If it is not a long straight drive, the map matching process is prohibited in the car position indicating process (Step S39).

After Step S39, the previous curve way running data Dn-1 replaces the curve way running data Dn-2 of the two-time before, and the currently stored curve way running data Dn replaces the previous curve running data Dn-1 (Step S40). Further, the curve way direction of this time, and the car moving direction and location immediately before and after the curve way of this time are stored as the curve way running data Dn (Step S41). The route measured from Step S36 to S41 is referred to as "actual route".

Subsequently, the control circuit 8 determines whether the current curve way running condition represented by the curve way running data Dn is substantially the same as the curve way running condition of the two-time before, which represented by the curve running data Dn-2 (Step S42). Specifically, it is determined whether the curve way direction of this time is the same as the curve way direction of the two-time before, the curve way running distance of this time is substantially the same as that of the two-time before, the direction of the straight way extending to the entrance of the curve way of this time is substantially the same as in the two-time before, and the direction of the straight way extending from the exit of the curve way of this time is substantially the same as in the two-time before. The curve way running distance is calculated using output data of the self-contained sensors.

When the curve way running condition of this time is substantially the same as the curve way running condition of the two-time before, the control circuit 8 determines whether the difference between the moving direction immediately after the exit of the curve way of this time, which is represented by the curve running data Dn, and the moving direction immediately after the exit of the curve way of the two-time before, which is represented by the curve running data Dn-2, falls within a predetermined range (tolerance) (Step S43). If the difference is within the predetermined range, the control circuit 8 calibrates the current moving direction θ an detected by the angular velocity sensor 3 when the car is moving in the straight way in the car park (Step S44). Specifically, the moving direction θ an calculated by the equation (2) on the basis of the measurement data of the angular velocity sensor 3 is forced to match to the direction of the straight way already known. Accordingly, the current car location is present on the straight way.

When Step S37 determines that the car speed is not low, when Step S38 determines that the car is moving on the long straight way, when Step S42 determines that the curve way running condition of this time is not substantially the same as the curve way running condition of the two-time before, or when Step S43 determines that the difference between the two moving directions is greater than the predetermined range, then the mode flag F3 becomes "0" (Step S45). The control circuit 8 then cancels the prohibition of the map matching process (Step S46).

In the above described car navigation apparatus, the current car location is determined from the GPS car position data obtained from the GPS device 1, the self-contained car position data obtained from the self-contained sensors (i.e., speed sensor 2, angular velocity sensor 3 and acceleration sensor 4) and the map matching process when the car is cruising under a normal condition. On the other hand, when the car enters the parking lot/tower and moves therein, and the road data of the parking lot/tower is available in the storage unit 5, then the current car location is determined from the self-contained car position data obtained from the self-contained sensors and the map matching process. The GPS car position data from the GPS device 1 is disregarded. When the car moves in the parking lot/tower, more accurate current location of the car can be obtained by simply applying the map matching process to the self-contained car position data, rather than by applying the map matching process to the combination of the GPS car position data and self-contained car position data. Even if the car exits the parking lot/tower, the GPS car position data is still inaccurate till a predetermined period or distance is reached after exiting the parking lot/tower. Thus, the current car location is determined by applying the map matching process to only the self-contained car position data.

Even if the map data stored in the storage unit 5 does not include any information about a fact that the building concerned is a multi-floor car park together with information about driveways in the building, the navigation apparatus can enter the multi-floor car park mode to detect the curve ways and presume (the pattern of) the driveway on the floor as long as the driveway on the floor has the same and simple pattern with symmetrical curve ways as shown in FIG. 3. In addition, since the moving direction is calibrated using the predicted straight way on the floor, the current car location can be accurately determined on the basis of only the car position data supplied from the self-contained sensors. As a result, the current car location displayed at Step S17 is present on the predicated pattern.

The determinations at Steps S42 and S43 constitute a comparison means for determining whether an actual running route determined by the measurement data supplied from the measurement device(s) coincides with the predicted route (pattern). The term "coincide" includes a case where an integrated value of coordinate excursion between the actual running route and predicted route falls within the predetermined tolerance. The tolerance in the moving direction is, for example, ±10 degrees. The tolerance disregards an error caused, for instance, when the car moves from one lane to another lane on a multi-lane highway or when the car moves along a center line of the driveway this time but the car has moved along the edge of the driveway one time before.

It should be noted that the present invention is not limited to the illustrated and described embodiment. For example, although the mobile body is the car in the embodiment, the mobile body may be a human. The parking lot/tower may be replaced with a department store or restaurant if the mobile body is a human.

Although the self-contained sensors are the speed sensor 2, angular velocity sensor 3 and acceleration sensor 4 in the above described embodiment, a geomagnetic sensor and/or other sensors may be employed.

The driveway pattern is not limited to that shown in FIG. 3. For instance, the driveway pattern may be a rectangular or square.

The above description deals with the multi-floor car park, but the present invention can be applied to a single-floor parking lot with or without a roof if the car repeatedly runs the same driveway.

This application is based on Japanese patent application No. 2001-137208, and the entire disclosure thereof is incorporated herein by reference.

What is claimed is:

1. A navigation apparatus comprising:
   a measurement unit for measuring a moving direction and current location of a mobile body in accordance with navigation parameters of the mobile body;
   a presumption device for presuming a route pattern representing straight and curve ways along which the mobile body has moved, on the basis of the moving direction and current location of the mobile body measured by the measurement unit;
   a comparison unit for determining whether an actual route pattern determined in accordance with the moving direction and current location of the mobile body measured by the measurement unit after presumption of the route pattern matches the presumed route pattern; and
   a calibration unit for calibrating the moving direction and current location of the mobile body measured by the measurement unit on the basis of the presumed route patter, when the comparison unit determines that the actual route pattern matches the presumed route pattern.

2. The navigation apparatus according to claim 1, wherein the calibration unit calibrates the moving direction of the mobile body on the basis of the presumed route patter when the current location of the mobile body measured by the measurement unit is present on the straight way.

3. The navigation apparatus according to claim further including:
   a map matching process unit for applying a map matching process on the current moving direction and current location of the mobile body measured by the measurement unit, using road data included in map data prepared beforehand, to determine a current location of the mobile body; and
   a prohibition unit for prohibiting application of the map matching process when the presumption unit presumes the route pattern.

4. The navigation apparatus according to claim 1, wherein the mobile body is at least one of a car and a human.

5. The navigation apparatus according to claim 1 further including at least one of a speed sensor, an angular velocity sensor and an acceleration sensor to provide the navigation parameters of the mobile body.

6. The navigation apparatus according to claim 1 further including a determination unit to determine whether the mobile body exists within confines of a predetermined structure.

7. The navigation apparatus according to claim 6 further including a GPS device to provide a moving direction and current location of the mobile body when the determination unit determines that the mobile body does not exist within the confines of the predetermined structure.

8. The navigation apparatus according to claim 6, wherein the predetermined structure is a roofed building.

9. The navigation apparatus according to claim 1, wherein the presumption unit presumes the route pattern when the mobile body exists in a structure for which no map data is available.

10. The navigation apparatus according to claim 1, wherein the presumption unit presumes the route pattern when the mobile body exists in a roofed structure.

11. A method comprising the steps of:
    A) measuring a moving direction and location of a mobile body using sensors;
    B) presuming a first route pattern along which the mobile body has moved, on the basis of the moving direction and location of the mobile body measured at Step A;
    C) repeating step A;
    D) determining a second route pattern along which the mobile body has moved, on the basis of the moving direction and location of the mobile body measured at Step C;
    E) determining whether a difference between the first route pattern and second route pattern falls within a predetermined range; and
    F) calibrating the moving direction and location of the mobile body measured at Step C on the basis of the first route patter, when Step E determines that the difference between the first and second route patterns falls within the predetermined range.

12. The method according to claim 11, wherein Step F calibrates the moving direction of the mobile body on the basis of the first route patter while the mobile body is moving straight.

13. The method according to claim 11 further including the step of prohibiting application of the map matching process when Step B presumes the first route pattern.

14. The method according to claim 11, wherein the mobile body is at least one of a car and a human.

15. The method according to claim 11, wherein the predetermined range is about 10 degrees.

16. The method according to claim 11 further including the step of G) determining whether the mobile body exists within confines of a predetermined structure.

17. The method according to claim 16, wherein the predetermined structure is a roofed building.

18. The method according to claim 11, wherein Step B presumes the first route pattern when the mobile body exists in a structure for which no map data is available.

19. The method according to claim 11, wherein Step B presumes the first route pattern when the mobile body exists in a roofed structure.

20. An apparatus comprising:
    first means for measuring a moving direction and location of a mobile body;
    second means for presuming a first route pattern along which the mobile body has moved, on the basis of the moving direction and location of the mobile body measured by the first means;
    third means for measuring the moving direction and location of the mobile body at a different time than the first means;
    fourth means for determining a second route pattern along which the mobile body has moved, on the basis of the moving direction and location of the mobile body measured by the third means;
    fifth means for determining whether a difference between the first route pattern and second route pattern falls within a predetermined range; and
    sixth means for calibrating the moving direction and location of the mobile body measured by the third means on the basis of the first route patter, when the fifth means determines that the difference between the first and second route patterns falls within the predetermined range.

* * * * *

UNITED STATES PATENT AND TRADEMARK OFFICE
CERTIFICATE OF CORRECTION

PATENT NO.     : 6,574,550 B2
DATED          : June 3, 2003
INVENTOR(S)    : Masaya Hashida It is certified that error appears in the above-identified patent and that said Letters Patent is hereby corrected as shown below:

<u>Column 9,</u>
Line 38, should read
    3. The navigation apparatus according to claim 1 further including:
    a map matching process unit for applying a map matching process on the current moving direction and current location of the mobile body measured by the measurement unit, using road data included in map data prepared beforehand, to determine a current location of the mobile body; and
    a prohibition unit for prohibiting application of the map matching process when the presumption unit presumes the route pattern.

Signed and Sealed this

Seventh Day of October, 2003

JAMES E. ROGAN
*Director of the United States Patent and Trademark Office*